United States Patent [19]

Reed et al.

[11] Patent Number: 4,553,760

[45] Date of Patent: Nov. 19, 1985

[54] FLEXIBLE SEAL FOR A SPHERICAL JOINT

[75] Inventors: Lyle T. Reed, Farmington; Arthur E. Olt, Jr., Pekin, both of Ill.

[73] Assignee: Caterpillar Tractor Co., Peoria, Ill.

[21] Appl. No.: 672,725

[22] Filed: Nov. 19, 1984

[51] Int. Cl.⁴ .................. F16J 15/24; F16J 15/32; B62D 55/00

[52] U.S. Cl. .................................. 277/12; 277/50; 277/152; 180/9.5; 403/57; 305/11

[58] Field of Search ............... 277/12, 32, 50, 152, 277/153; 180/9.5; 403/52, 53, 57, 58; 464/129, 131, 133; 305/11-15; 384/145, 147, 148

[56] References Cited

U.S. PATENT DOCUMENTS

| | | | |
|---|---|---|---|
| 2,059,068 | 10/1936 | Weckstein | 277/152 |
| 3,680,924 | 8/1972 | Otto et al. | 305/11 |
| 4,034,996 | 7/1977 | Manita et al. | 403/140 X |
| 4,232,754 | 11/1980 | Corrigan et al. | 180/9.5 |
| 4,385,673 | 5/1983 | Olt | 180/9.5 |

FOREIGN PATENT DOCUMENTS

| | | | |
|---|---|---|---|
| 711737 | 10/1941 | Fed. Rep. of Germany | 277/153 |
| 1024718 | 1/1953 | France | 277/153 |
| 1040930 | 9/1966 | United Kingdom | 277/152 |
| 1371341 | 10/1974 | United Kingdom | 277/153 |

Primary Examiner—Robert S. Ward
Attorney, Agent, or Firm—O. Gordon Pence

[57] ABSTRACT

A flexible seal assembly has an elastomeric body with a convoluted intermediate portion for accommodating pivotal movement about the center of a spherical joint and an integral radial seal lip for accommodating rotational movement about a central axis of the joint. The seal lip extends from an inner diameter portion of elastomeric body in proximate relationship to a rigid plastic lip restraining ring which is molded into such inner diameter portion such that flexure loads are carried by the restraining ring and have no effect on the seal lip.

8 Claims, 4 Drawing Figures

FLEXIBLE SEAL FOR A SPHERICAL JOINT

DESCRIPTION

1. Technical Field

This invention relates generally to flexible seals for spherical joints and more particularly to a flexible seal having an integral sealing lip for dynamic sealing of rotational movement.

2. Background Art

The present invention is an improvement to the flexible seal assembly disclosed in U.S. Pat. No. 4,385,673 for "Spherical Joint With Flexible Seals", which patent issued May 31, 1983 to Arthur E. Olt Jr. and is assigned to the assignee hereof. The annular seal assembly of the U.S. Pat. No. 4,385,673 is composed of numerous components including an outer steel mounting ring, a flexible member, an inner steel load transfer member or ring, and a separate annular lip seal. The flexible member accommodates the pivotal movement of the spherical joint while the radial lip seal accommodates rotational movement. The lip seal is itself constructed from two components, the first being the elastomeric lip seal material, and the second being an outer steel mounting ring to enable the lip seal to be press fittedly mounted within a counterbore provided in the load transfer member. While the seal assembly of U.S. Pat. No. 4,385,673 performs quite satisfactorily, its numerous components make it complex and expensive to manufacture. In addition, it is difficult to obtain a high strength bond between an elastomer and steel. As a consequence, bond separation may occur between the flexible member and the load transfer member resulting in premature failure of this seal assembly.

The present invention is directed to overcoming one or more of the problems as set forth above.

DISCLOSURE OF THE INVENTION

In accordance with one aspect of the present invention, a flexible seal assembly is provided for use in sealing a spherical joint. The flexible seal assembly includes an outer mounting ring, an inner lip restraining ring, and an elastomeric body. The elastomeric body has an outer diameter portion secured to the mounting ring, an inner diameter portion secured to the lip restraining ring and a thin walled convoluted intermediate portion having a generally S-shaped configuration interconnecting the outer and inner diameter portions and providing sufficient flexure capability for accommodating pivotal movement of the spherical joint. The inner lip restraining ring is constructed of a rigid plastic material. The elastomeric body is of a unitary construction of a tough wear resistant elastomer and includes an integral radial seal lip extending from the inner diameter portion of the body in proximate relationship to the lip restraining ring.

BEST MODE FOR CARRYING OUT THE INVENTION

Figure 1:
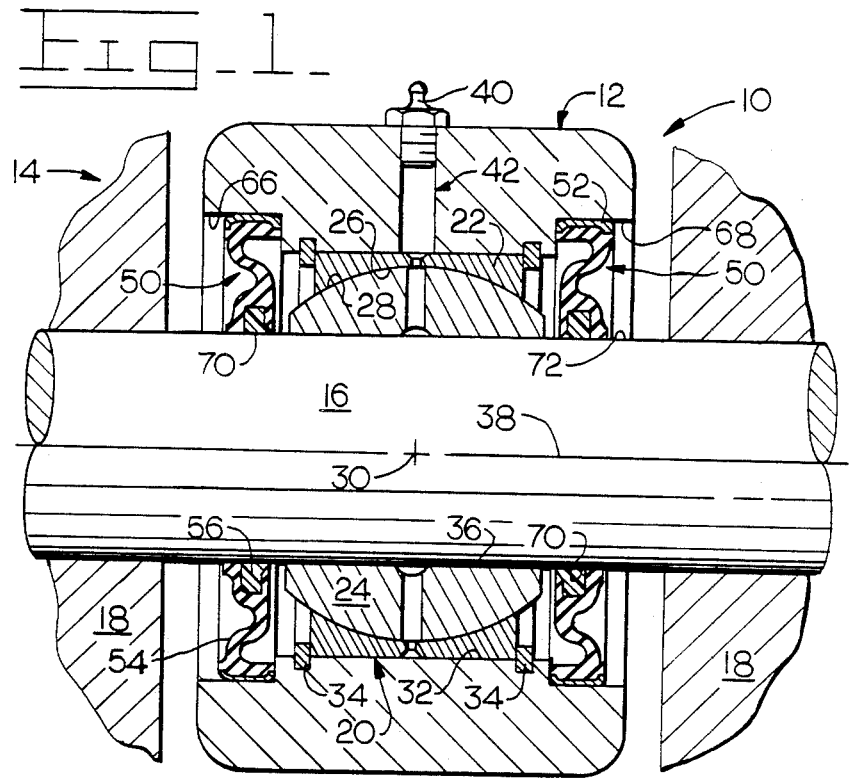
FIG. 1 is a cross-sectional view of a spherical joint incorporating the flexible seals embodying the principles of the present invention.

Referring more particularly to the drawings, a spherical joint 10 is illustrated in FIG. 1 for connecting a first member or equalizer bar 12 of a track-type tractor (not shown) to a second member or track roller frame, designated by reference numeral 14, of such tractor. The spherical joint 10 includes a pin 16 which extends between and is carried by a pair of laterally spaced brackets 18 of the track roller frame 14. The joint 10 further includes a spherical bearing assembly 20 having an outer cup 22 and an inner bushing 24. The cup 22 and bushing 24 have mating spherical bearing surfaces 26,28, respectively, having a common center of revolution at 30. The cup 22 may be of a split or two-piece construction to facilitate the mounting of the bushing 24 therein. The cup 22 is mounted in a bore 32 provided in the equalizer bar 12 and is retained therein by a pair of snap rings 34 mounted on each side thereof.

The bushing 24 has an inner cylindrical bearing surface 36 which receives the pin 16 and rotatably and reciprocatably mounts the equalizer bar 12 for rotational movement about and axial movement along the central axis 38 of the pin 16. Such rotational movement may also occur between the mating spherical surfaces 26,28. However, such spherical surfaces normally provide pivotal movement of the equalizer bar 12 relative to the track roller frame 14 about the center 30 of such surfaces.

A standard grease fitting 40 and appropriate intercommunicating passages, shown generally at 42, are provided in the joint 10 to lubricate the bearing surfaces 26,28,36.

Figure 2:
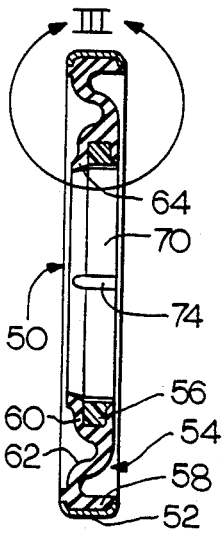
FIG. 2 is a cross-sectional view of one of the seals shown in FIG. 1.
Figure 3:
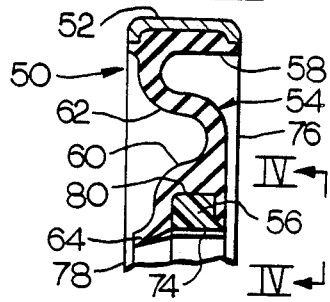
FIG. 3 is an enlarged fragmentary cross-sectional view of the seal of FIG. 2.
Figure 4:
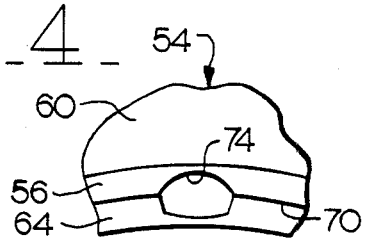
FIG. 4 is a fragmentary elevational view taken in the direction of arrows IV—IV of FIG. 3.

In accordance with the present invention, a pair of improved annular flexible seal assemblies 50 are provided for sealing the joint 10. Each such seal assembly 50 is mounted between the equalizer bar 12 and the pin 16 on a respective one of the opposite sides of the spherical bearing assembly 20 to continuously seal the joint 10 during operation thereof. As best shown in FIGS. 2 and 3, each seal assembly 50 includes an outer mounting ring 52, an elastomeric body 54, and an inner, lip restraining ring 56. The elastomeric body 54 has an outer diameter portion 58 secured to the mounting ring 52, an inner diameter portion 60 secured to the inner ring 56, and a generally thin walled, convoluted intermediate portion 62 having a generally S-shaped configuration interconnecting the outer and inner diameter portions 58,60. The entire elastomeric body 54 is of a unitary construction of a tough, wear resistant elastomer, such as polyurethane, which includes an integral radial seal lip 64.

The outer ring 52 is preferably constructed from steel and sized to enable each of the seal assemblies 50 to be press fittedly secured into a respective one of a pair of counterbores 66,68 disposed on opposite sides of the bore 32 of the equalizer bar 12.

The lip restraining ring 56 is preferably constructed from a rigid plastic material, such as nylon or polycarbonate. The plastic material is also preferably filled with glass fibers to enhance the tensile strength characteristics of the ring and to maintain its dimensional size under the influence of flexure loads which may be exerted thereon during operation of the joint 10 as will be hereinafter more fully described. The ring 56 is provided with an inner diameter 70 which is closely sized relative to the diameter or cylindrical sealing surface 72 of the pin 16. Such inner diameter 70 is of a size to permit free rotational and reciprocational movement of the pin 16 therewithin, but in sufficiently close relationship to the pin for engagement therewith during flexure of the seal assembly 50 as the result of pivotal movement of the joint 10 about the center 30 of the bearing assembly 20. A plurality of axially extending grease escape grooves 74 are provided along the inner diameter 70 of the ring 56 and into lip 64 to communicate lubricant or grease on the inboard side 76 of the seal assembly 50 to the seal lip 64 which is located on the outboard side 78 thereof.

While the lip restraining ring 56 is shown in the drawings with a generally rectangular configuration, it should be understood that the configuration of the ring 56 is not critical, except as otherwise described herein. For that reason, the remaining sides of the ring extending from one end of the inner diameter 70 to the other end are referred to herein collectively as the outer peripheral side 80.

INDUSTRIAL APPLICABILITY

The flexible seal 50 of the present invention finds particular use in a spherical joint application of the type disclosed in U.S. Pat. No. 4,385,673 wherein suitable flexure ability is required to accommodate pivotal movement of the joint about the center of the spherical bearing used therein. Such flexure ability is provided by the convoluted intermediate portion 62 of the elastomeric body 54 in a manner more fully described in U.S. Pat. No. 4,385,673, which description is incorporated herein by reference. It is also desirable that such seal assembly 50 have a dynamic sealing capability to accommodate rotational movement about the pin axis 38 of such spherical joint 10. Such dynamic sealing capability is provided in the present seal assemblies 50 by the radial seal lip 64 which is an integral part of the elastomeric body 54. Body 54 is of a unitary construction from an elastomer having the flexibility needed for the intermediate portion 62 of the elastomeric body 54 and having tough wear resistant characteristics needed for the seal lip 64 thereof. A body 54 made from polyurethane has been used with successful results. The elastomeric body 54 may be formed in a mold containing the inner and outer rings 56 and 52, respectively. Thus, the seal assembly 50 is constructed in a single, cost-effective operation.

In addition, it has been found that a superior, more reliable bond is achieved in the present construction between the elastomeric body 54 and the lip restraining ring 56. This bond minimizes premature seal failure due to bond separation and greatly enhances the service life of the seal assembly 50. This superior bond is achieved, in part, by the substantially complete encasement of the entire outer peripheral surface 80 of the ring 56 within the body 54 so as to maximize the amount of bond surface area between the body 54 and ring 56. A further increase in bond strength is achieved by the use of a plastic material, such as polycarbonate, for the ring 56 because it has been found that the polyurethane of the body 54 has better adhesion to such plastic than to the prior load transfer member made of steel.

The integral seal lip 64 extends, in a cantilevered fashion, from the outboard side of the inner diameter portion 60 of the body 54 in proximate relationship to the lip restraining ring 56 into radial sealing contact with the sealing surface 72 of the pin 16.

During pivotal movement of the joint 10 about the center 30 of the spherical bearing assembly 20, the lip restraining ring 56 contacts and moves with or follows the movement of the pin 16 due to its close fitting relationship therewith. The seal lip 64 also moves with the pin 16 because of its proximate bonded relationship to restraining ring 56. Thus, the lip 64 is maintained in continuous intimate sealing contact with the sealing surface 72 of the pin 16, irrespective of the pivotal movement of the equalizer bar 12 relative to the pin 16. Forces which may be generated as the result of the flexing occurring in the intermediate portion 62 of the seal body 54 are borne by the restraining ring 56 and are isolated from the seal lip 64.

The grease grooves 74 in the restraining ring 56 are effective in releasing any excess amount of grease which may be introduced into the joint 10 through the grease fitting 40. The grooves 74 allow pressure generated by such overgreasing to act directly upon the seal lip 64, which causes the lip to raise off its sealing surface 72 in order to expel any excess grease. This prevents the grease pressure from forcing the seal assembly outwardly which may misposition the seal lip 64 on the pin 16 and restrict or reduce the flexure ability of the flexible intermediate portion 62 of the seal body 54.

Other aspects, objects, and advantages of this invention can be obtained from a study of the drawings, the disclosure, and the appended claims.

We claim:

1. In a flexible seal assembly for use in sealing a spherical joint, said flexible seal assembly having an outer mounting ring, an inner lip restraining ring, and an elastomeric body, said body having an outer diameter portion secured to said mounting ring, an inner diameter portion secured to said lip restraining ring and a thin walled convoluted intermediate portion having a generally S-shaped configuration interconnecting said outer and inner diameter portions and providing sufficient flexure capability for accommodating pivotal movement of said spherical joint, the improvement comprising:
   said inner lip restraining ring being constructed of a rigid plastic material; and
   said elastomeric body being of a unitary construction of a tough wear resistant elastomer and including an integral radial seal lip extending from the inner diameter portion of the body in proximate relationship to the lip restraining ring.

2. The seal assembly of claim 1 wherein said integral seal lip is on an outboard side of said seal assembly and said lip restraining ring is on an inboard side thereof, said lip restraining ring having an inner diameter and a plurality of axially extending grooves along said inner diameter for communicating lubricant on the inboard side of said seal assembly to said seal lip.

3. The seal assembly of claim 2 wherein said rigid plastic material of the lip restraining ring is nylon and said elastomer of said body is polyurethane.

4. The seal assembly of claim 3 wherein said nylon of the lip restraining ring is filled with glass fibers to provide said ring with a greater tensile strength.

5. The seal assembly of claim 1 wherein said lip restraining ring has an outer peripheral surface, said outer peripheral surface being generally completely encased within said inner diameter portion of said elastomeric body.

6. In a spherical joint for pivotally and rotatably mounting a first member to a second member, said joint having a spherical bearing assembly pivotable about a center thereof, a pin disposed through and rotatably mounted within said bearing assembly, and a pair of annular flexible seal assemblies, said bearing assembly being carried by said first member, said pin being mounted to said second member and having a cylindrical sealing surface, and said seal assemblies being mounted to said first member on each side of said bearing assembly and about said cylindrical sealing surface of the pin and including an elastomeric body having a convoluted portion to accommodate said pivotal movement, wherein the improvement comprises:

an inner lip restraining ring of a rigid plastic material, said ring having an inner diameter and an outer peripheral surface from one end of said inner diameter to the other; and said elastomeric body having an inner diameter portion generally completely encasing and bonded to the outer peripheral surface of said restraining ring and including an integral seal lip extending therefrom in proximate relationship to said lip restraining ring into dynamic sealing contact against said sealing surface of said pin.

7. The joint of claim 6 wherein said rigid plastic material of the lip restraining ring is nylon and said elastomeric body is polyurethane.

8. The joint of claim 7 wherein said nylon of the lip restraining ring is filled with glass fibers to provide said ring with a greater tensile strength.

* * * * *